J. LOCKE.
Cheese-Cutters.

No. 138,903.

Patented May 13, 1873.

WITNESSES.
Wm. K. Duhamel
Alex S. Davidson

INVENTOR.
John Locke
Per H. S. Abbot.
Attorney

UNITED STATES PATENT OFFICE.

JOHN LOCKE, OF LEWISBURG, PENNSYLVANIA.

IMPROVEMENT IN CHEESE-CUTTERS.

Specification forming part of Letters Patent No. 138,903, dated May 13, 1873; application filed November 7, 1872.

*To all whom it may concern:*

Be it known that I, JOHN LOCKE, of Lewisburg, county of Union and State of Pennsylvania, have invented certain new and useful Improvements in Cheese-Cutters, of which the following is a specification:

The nature of my invention relates to devices for cutting cheese; and consists in a turn-table, divided into sections upon which the cheese is placed, and in the devices for operating the knife. It also consists in making the parts in such a manner that they can be readily attached and detached from the counter, as will be more fully set forth hereafter.

Figure 1:
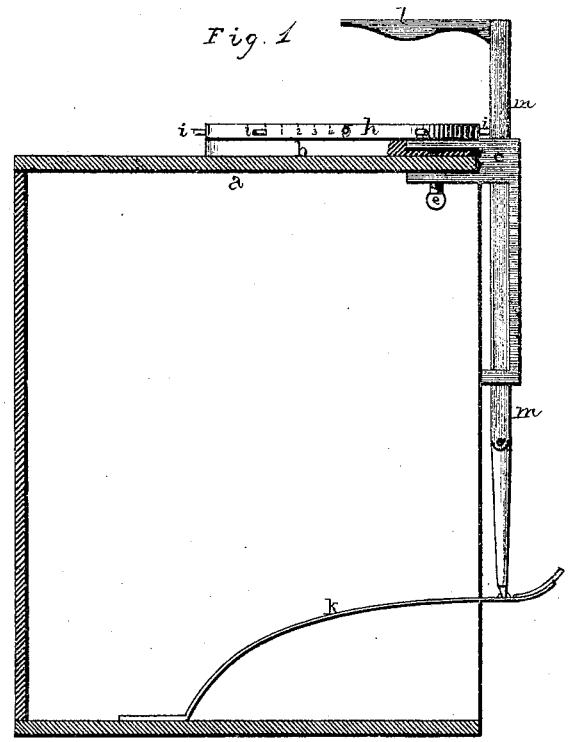
Figure 2:
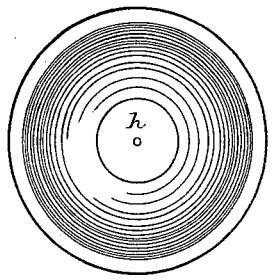

Figure 1 of the accompanying drawing represents a side elevation of my invention, partly in section. Fig. 2 is a plan view of the turn-table.

$a$ represents a counter, or any suitable stand or frame to which my device is attached. Upon its top is secured the circular bed-plate $b$, by means of the guiding-clamp $c$ and set-screw $e$, which hold it firmly in position. Turning upon the pivot, in the middle of this bed-plate, is the revolving turn-table $h$, having a dished or hollowed out top, and which is divided off into sections by means of the pins $i$. There may be any number of these sections, but I prefer to use eight (8), and I still further divide each section into five (5) divisions, making forty (40) for the whole table. When the cheese is placed upon the table, the divisions at once show the operator just the exact amount to cut. For instance, if the cheese weighs forty (40) pounds, then each space indicates one pound; if fifty pounds, then one and one-fourth pound; and so on. Secured to the floor is a spring treadle or retractor, $k$, which is attached to the handle of the knife $l$, by the connecting rod $m$, and which at once throws the knife up ready for another cut as soon as the foot is removed. The knife is provided with the rounding, irregular edge, so as to enter the cheese gradually, and to cut more easily, the face of the turn-table being hollowed or grooved so as to correspond with it. The handle or rod to which the knife is secured passes up through the clamp $c$, which acts not only to guide it but also serves to secure the bed-plate and the whole device to the counter. By removing the set-screw and loosening the end of the spring-treadle, the whole machine can be removed from one place and secured to another, making it more desirable and valuable than any which have heretofore been used.

Having thus described my invention, what I claim as new and desire to secure by Letters Patent is—

1. The guiding-clamp $c$, when used to secure the bed-plate to the counter, and to guide the knife, substantially as set forth.

2. The spring-treadle $k$, in combination with a cheese-cutting device, substantially as described.

3. A cheese-cutting machine consisting of a removable bed-plate and rotary table, a spring-treadle to operate the knife, and a guiding-clamp and set-screw to secure the bed-plate to the counter, when all are arranged to operate substantially as shown and described.

In testimony that I claim the foregoing as my invention I hereunto affix my signature this 4th day of November, 1872.

JOHN LOCKE.

Witnesses:
   J. A. MENTZ,
   GRIGGS MARSH.